United States Patent [19]

Ando

[11] Patent Number: 5,497,496
[45] Date of Patent: Mar. 5, 1996

[54] SUPERSCALAR PROCESSOR CONTROLLING FETCHING OF INSTRUCTIONS BASED UPON NUMBER OF EMPTY INSTRUCTIONS REGISTERS DETECTED FOR EACH CYCLE

[75] Inventor: Hideki Ando, Hyogo, Japan

[73] Assignee: Mitsubishi Denki Kabushiki Kaisha, Tokyo, Japan

[21] Appl. No.: 281,128

[22] Filed: Jul. 28, 1994

Related U.S. Application Data

[63] Continuation of Ser. No. 874,945, Apr. 29, 1992, abandoned.

[30] Foreign Application Priority Data

Jun. 24, 1991 [JP] Japan ..................... 3-151867

[51] Int. Cl.$^6$ ........................................ G06F 9/30
[52] U.S. Cl. .................... 395/800; 395/375; 364/DIG. 1; 364/230
[58] Field of Search ...................... 395/375, 800

[56] References Cited

U.S. PATENT DOCUMENTS

| | | | |
|---|---|---|---|
| 4,942,525 | 7/1990 | Shintani et al. ................... | 395/375 |
| 5,121,502 | 6/1992 | Rau et al. ........................... | 395/800 |
| 5,133,077 | 7/1992 | Karne et al. ....................... | 395/800 |
| 5,185,868 | 2/1993 | Tran .................................... | 395/375 |
| 5,202,967 | 4/1993 | Matsuzaki et al. ................ | 395/375 |
| 5,267,350 | 11/1993 | Matsubara et al. ............... | 395/375 |

OTHER PUBLICATIONS

Grohoski, "Machine organization of the IBM RISC System/6000 Processor", IBM Journal of Research and Development, vol. 34, No. 1, Jan. 1990, pp. 37–58.

*Primary Examiner*—Ken S. Kim
*Attorney, Agent, or Firm*—Lowe, Price, Leblanc & Becker

[57] ABSTRACT

A plurality of instructions are read out from an instruction cache 1 for each cycle and temporarily stored in a second shift register SR2. The instructions stored in second shift register SR2 are transferred to empty positions of instruction registers IR0 to IR3 and fetched. An instruction decoder 3 selects instructions which can be processed in a parallel manner from the instructions stored in instruction registers IR0 to IR3 and supplies the same to any of processing units 4 to 7. A selector control circuit 12 controls the selection state of each selector 100 to 103, 200 to 203 based on a NUM signal indicating the number of empty instruction registers. The instructions stored in second shift register SR2 are thereby transferred to emptied instruction registers only. In this way, a new instruction is supplied to an empty instruction register as a supplement for each cycle.

12 Claims, 3 Drawing Sheets

FIG. 2

| CYCLE | INSTRUCTION REGISTER IR0 IR1 IR2 IR3 | ICR | CNT | NUM | REG |
|---|---|---|---|---|---|
| 1 | 1 2 3 4 | 1 | 1 | 1 | 0 |
| 2 | 2 3 4 5 | 1 | 2 | 2 | 1 |
| 3 | 4 5 6 7 | 1 | 2 | 2 | 2 |
| 4 | 6 7 X X | 0 | 1 | 3 | 2 |
| 5 | 7 X X X | 0 | 0 | 3 | 3 |
| 6 | 7 8 9 10 | 1 | 3 | 3 | 3 |

FIG. 3

| NUM | SELECTOR 100, 200 | SELECTOR 101, 201 | SELECTOR 102, 202 | SELECTOR 103, 203 |
|---|---|---|---|---|
| 0 | a | a | a | a |
| 1 | a | a | a | b |
| 2 | a | a | b | b |
| 3 | a | b | b | b |
| 4 | b | b | b | b |

| CYCLE | INSTRUCTION |     |     |     |
|-------|-------------|-----|-----|-----|
| 1     | <u>1</u>    | 2   | 3   | 4   |
| 2     | ×           | <u>2</u> | <u>3</u> | 4   |
| 3     | ×           | ×   | ×   | <u>4</u> |
| 4     | <u>5</u>    | <u>6</u> | 7   | 8   |

SUPERSCALAR PROCESSOR CONTROLLING FETCHING OF INSTRUCTIONS BASED UPON NUMBER OF EMPTY INSTRUCTIONS REGISTERS DETECTED FOR EACH CYCLE

This application is a continuation of application Ser. No. 07/874,945 filed Apr. 29, 1992 now abandoned.

BACKGROUND OF THE INVENTION

1. Field of the Invention

The invention relates generally to superscalar processors and, more particularly, relates to processor systems capable of executing a plurality of instructions in a parallel manner with a plurality of processing units provided in parallel.

2. Description of the Background Art

A superscalar processor is a high-performance microprocessor having a parallel processing mechanism called "superscalar type" built therein and described, for example, in S. McGeady "The i960CA Superscalar Implementation of the 80960 Architecture", COMPCON 1990 IEEE pp. 232–240 or Randy D. Groves "An IBM Second Generation RISC Processor Architecture", COMPCOM 1990 IEEE pp. 166–172. In the superscalar type, a plurality of processing units provided in parallel execute a plurality of instructions in a parallel manner. The superscalar processor simultaneously fetches a plurality of instructions from an instruction memory and decodes the same. It selects instructions which can be processed in a parallel manner from the decoded instructions and supplies the same to the processing units.

A superscalar processor as stated above is expected to be applied for a variety of purposes since the performance of processing can be remarkably enhanced compared with that of a conventional normal microprocessor.

FIG. 4 shows a general structure of a conventional superscalar processor. In the figure, a plurality of instructions to be processed are stored in an instruction memory 1. An instruction fetch circuit 2 reads out a plurality of instructions (for example, four instructions) from instruction memory 1 at the same time and fetches the same. An instruction decoder 3 decodes the plurality of instructions fetched by instruction fetch circuit 2, selects instructions which can be processed in a parallel manner and supplies the same to processing units 4 to 7. Processing units 4 to 7 have a pipeline structure, for example, and each of them independently executes a supplied instruction. Though the contents to be processed in processing units 4 to 7 may be undetermined, processing units 4 and 5 are structured as integer arithmetic units in FIG. 4, processing unit 6 is structured as a unit for loading or storing to a data memory 8, and processing unit 7 is structured as a floating-point arithmetic unit. Data memory 8 is a memory for storing data.

As stated above, since the superscalar processor shown in FIG. 4 can simultaneously execute a plurality of instructions in a parallel manner, a processing speed can be increased compared with that of a normal microprocessor.

The superscalar processor shown in FIG. 4 operates for each cycle of a clock signal (not shown) synchronizing with the clock signal. FIG. 5 is a diagram showing one example of instruction fetch and instruction output of the superscalar processor of FIG. 4 in four successive cycles. A description will be made below of one example of the operation of the superscalar processor shown in FIG. 4 with reference to FIG. 5.

(1) Cycle 1

In cycle 1, instruction fetch circuit 2 reads out and fetches four instructions 1 to 4 from instruction memory 1 in order. The four instructions 1 to 4 fetched by instruction fetch circuits 2 are decoded by instruction decoder 3. At this time, if there is no other instructions which can be processed in a parallel manner with instruction 1, instruction decoder 3 derives only instruction 1 at first fetched by instruction fetch circuit 2 at first and supplies the same to any of processing units 4 to 7. The numbers of the instructions supplied by instruction decoder 3 are underlined.

(2) Cycle 2

In cycle 2, instruction decoder 3 determines that instructions 2 and 3 can be processed in a parallel manner. Then, instruction decoder 3 fetches instructions 2 and 3 from instruction fetch circuit 2 and supplies each of them to any of processing units 4 to 7.

(3) Cycle 3

In cycle 3, since instruction 4 is only remaining in instruction fetch circuit 2, instruction decoder 3 derives instruction 4 from instruction fetch circuit 2 and supplies the same to processing unit 7.

(4) Cycle 4

In cycle 4, instruction fetch circuit 2 sequentially reads out and fetches four new instructions 5 to 8 from instruction memory 1. At this time, instruction decoder 3 determines that instructions 5 and 6 can be processed in a parallel manner among the instructions fetched by instruction fetch circuit 2 and supplies each of instructions 5 and 6 to any of processing units 4 to 7.

As stated above, in the superscalar processor shown in FIG. 4, instruction fetch circuit 2 cannot fetch a new instruction from instruction memory 1 until all the instructions fetched therein are supplied to the processing units by instruction decoder 3. Accordingly, instruction decoder 3 determines the relationship between the instructions on a 4-instruction basis. For example, even if instruction 4 and instructions 5 and 6 can be executed in a parallel manner, instruction 4 and instructions 5 and 6 are supplied to the processing units in separate cycles. Therefore, the parallel processing capability of processing units 4 to 7 cannot be fully utilized and a considerable increase in the processing speed cannot be expected.

SUMMARY OF THE INVENTION

Therefore, an object of the present invention is to provide a superscalar processor with a further increased processing speed.

The superscalar processor according to the present invention operates cyclically and includes a plurality of processing units, instruction storage means, fetch means, decode means, empty number detection means, and control means. Each processing unit is provided in a parallel manner and capable of executing a plurality of instructions in a parallel manner. Instruction storage means stores a plurality of instructions to be processed. Fetch means with a plurality of registers fetches the plurality of instructions from instruction storage means and stores the same in each register. Decode means decodes the instruction stored in each register of fetch means for each cycle, selects instructions which can be executed in parallel and simultaneously supplies the same to the processing units. The empty number detection means detects the number of empty registers in the fetch means for each cycle. The control means controls the number of instructions, which the fetch means fetches from the instruction storage means, in response to the result of the detection of the empty number detection means for each cycle.

According to the present invention, the number of empty registers in the fetch means is detected for each cycle and the number of instructions which the fetch means fetches from the instruction storage means is controlled for each cycle according to the detected number. Accordingly the fetch means can fetch the next instruction from the instruction storage means without waiting until all the instructions fetched therein are supplied to the processing units. As a result, the number of instructions decoded by the decode means for each cycle is increased and the number of instructions to be supplied in parallel can be increased. Accordingly, the plurality of processing units can be operated efficiently and a further increase in the processing speed can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing one example of the operation in the embodiment shown in FIG. 1.

FIG. 3 is a diagram showing the relationships between the values of a NUM signal in FIG. 1 and the selection states of each selector 100 to 103, 200 to 203.

DESCRIPTION OF THE PREFERRED EMBODIMENTS

Figure 1:
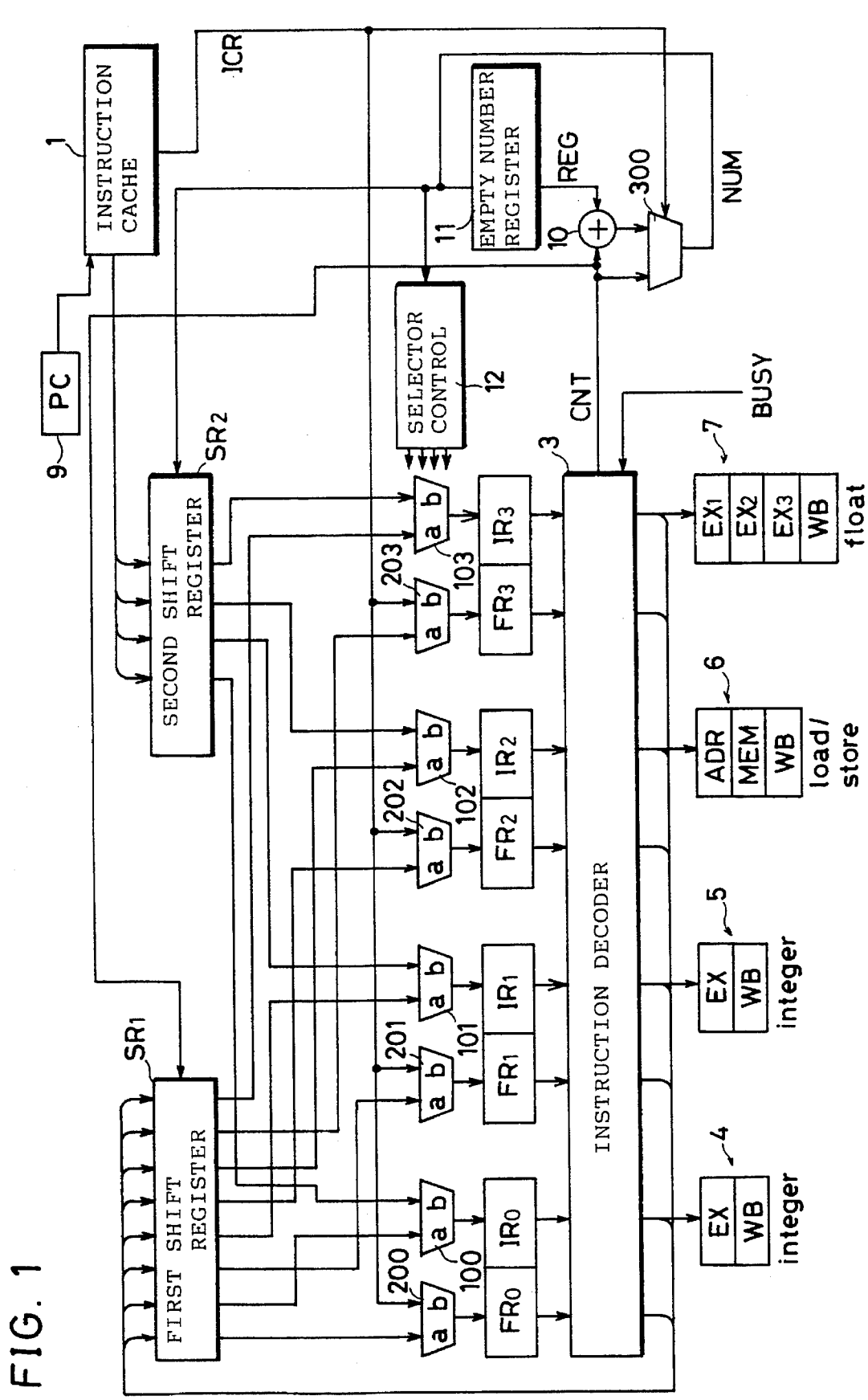
FIG. 1 is a block diagram showing a structure according to one embodiment of the present invention.

FIG. 1 is a block diagram showing a structure in accordance with one embodiment of the present invention. In the figure, a superscalar processor in accordance with this embodiment includes an instruction cache 1, a program counter 9, a first shift register SR1, a second shift register SR2, selectors 100 to 103 for selecting instructions, selectors 200 to 203 for selecting flags, instruction registers IR0 to IR3, flag registers FR0 to FR3, an instruction decoder 3, processing units 4 to 7, a selector 300, an adder 10, an empty number register 11 and a selector control circuit 12.

Instruction cache 1 as an instruction memory stores a plurality of instructions. Program counter 9 holds a first address of 4 instructions to be fetched from instruction cache 1 during one cycle. Program counter 9 holds a first address of 4 instructions to be fetched from instruction cache 1 during one cycle. Program counter 9 supplies the address to instruction cache 1. The instruction cache supplies four instructions in response to the address in the program counter. The contents held in the program counter is changed according to the request of the superscalar system. The request is issued, for example, when all of the four instructions supplied from the instruction cache are supplied to the processing units. If there is no instruction corresponding to the address supplied from program counter 9 within instruction cache 1, an external memory (not shown) is accessed. The instruction read out from the external memory is transferred to instruction cache 1 and written therein. It normally takes several cycles to transfer the instruction to instruction cache 1 from the external memory. Instruction cache 1 does not supply an instruction during the cycle in which the instruction is being transferred. Therefore, the instruction cannot be fetched from instruction cache 1 during that time. Instructions cache 1 causes an ICR signal to be at logic 1 in a cycle in which the instruction is read out and causes the ICR signal to be at logic 0 in a cycle in which the instruction is not read out. The ICR signal is supplied to each terminal b of selectors 200 to 203 and supplied to selector 300 as a control signal at the same time.

The four instructions read out from instruction cache 1 are once stored in second shift register SR2. Second shift register SR2 includes four unit registers cascade-connected each capable of storing one instruction. Second shift register SR2 shifts the stored instructions to the right by a prescribed amount and then supplies the contents stored in each unit register in parallel. The shift amount of second shift register SR2 is controlled by a NUM signal supplied from selector 300. This shifting operation removes unnecessary instructions and there remains the number of instructions corresponding to the number of empty ones among instruction registers IR0 to IR3. The parallel output from each unit register of second shift register SR2 is supplied to each terminal b of selectors 100 to 103.

An instruction stored in first shift register SR1 is supplied to each terminal a of selectors 100 to 103. A flag stored in first shift register SR1 is supplied to each a terminal of selectors 200 to 203. Selection in each of selectors 100 to 103, 200 to 203 is controlled by selector control circuit 12. Selector control circuit 12 controls the selection state in each selector based on the NUM signal from selector 300.

The outputs of selectors 100 to 103 are supplied to instruction registers IR0 to IR3, respectively. The outputs of selectors 200 to 203 are supplied to flag registers FR0 to FR3, respectively. Instruction decoder 3 selects instructions which can be processed in a parallel manner and supplies the same to processing units 4 to 7 by decoding the instructions stored in instruction registers IR0 to IR3. At this time, instruction decoder 3 refers to the flags stored in flag registers FR0 to FR3 and causes only the effective instructions to be target objects of decoding. Thereafter, instruction decoder 3 transfers data stored in instruction registers IR0 to IR3 and flag registers FR0 to FR3 to first shift register SR1 and supplies a CNT signal at the same time. The CNT signal is a signal representing the number of instructions supplied to processing units 4 to 6 by instruction decoder 3. Instruction decoder 3 stops decoding in response to a BUSY signal from processing units 4 to 7 when any of processing units 4 to 7 is not operating. The reason why the operation of the processing unit is stopped may be because, for example, data is not readily supplied from the data memory in processing unit 6 and it cannot proceed to the next process.

The CNT signal supplied from instruction decoder 3 is applied to first shift register SR1, selector 300 and adder 10. First shift register SR1 shifts the instructions and the flags transferred from instruction decoder 3 to the left by the number corresponding to the CNT signal. This shifting operation shifts the instructions, which were not supplied to the processing units in the previous cycle, to the left. After the shifting operation, first shift register SR1 supplies the instructions and the flags stored therein to selectors 100 to 103 and 200 to 203.

Selector 300 selects either of the CNT signal from instruction decoder 3 and the output of adder 10, and provides a NUM signal in response to an ICR signal from instruction cache 1. The NUM signal represents the number of empty ones among instruction registers IR0 to IR3. The NUM signal is applied to empty number register 11 as well as second shift register SR2 and selector control circuit 12 as stated above. Empty number register 11 temporarily stores the NUM signal. The output REG of empty number register 11 is applied to adder 10. Adder 10 adds the CNT signal from instruction decoder 3 to the output REG of empty number register 11.

The operation in accordance with the embodiment shown in FIG. 1 will be described below in more detail.

At first, a description will be made of a method of detecting the number of empty ones among instruction registers IR0 to IR3. If a new instruction can be fetched into an empty place of instruction registers IR0 to IR3 from instruction cache 1 in a certain cycle, the number NUM of empty instruction register in the cycle becomes equal to the number CNT of instructions supplied to the processing units from the instruction registers by instruction decoder 3 in the cycle. That is, NUM=CNT. If the instruction can be fetched from instruction cache 1, the ICR signal attains logic 1, so that selector 300 selects a CNT signal (representing the number of instructions transferred to the processing units from the instruction registers) supplied from instruction decoder 3 and outputs a NUM signal. Therefore, the NUM signal corresponds to the number of empty instruction registers.

If an instruction cannot be read out from instruction cache 1 in another cycle, a new instruction is not fetched in instruction registers IR0 to IR3. As a result, the number NUM of empty instruction registers becomes the sum of the number REG (stored in empty number register 11) of empty ones in the previous cycle and the number CNT of instructions supplied to the processing units from the instruction registers by instruction decoder 3 in the present cycle, that is, NUM=REG+CNT. If the instruction cannot be fetched from instruction cache 1, the ICR signal attains logic 0, so that selector 300 selects the output of adder 10 and provides a NUM signal. Adder 10 adds the CNT signal from instruction decoder 3 to the REG signal from empty number register 11. Therefore, the NUM signal supplied from selector 300 corresponds to the number of empty instruction registers.

The number of instructions to be stored in instruction registers IR0 to IR3 among the instructions read out from the instruction cache 1 is the number NUM of empty instruction registers. That is, empty instruction registers are filled up with instructions. The four instructions read out from instruction cache 1 in the same cycle are reduced to the number corresponding to the number of empty instruction registers and then stored in instruction registers IR0 to IR3 through selectors 100 to 103. The number of instruction is reduced in second shift register SR2. That is, second shift register SR2 shifts the four instructions read out from instruction cache 1 by the amount corresponding to the number of empty instruction registers indicated by the NUM signal from selector 300 and discards unnecessary instructions. The operation of second shift register SR2 will be described later in more detail.

Instructions fetched from instruction cache 1 must be processed in the processing units in the order in which they were fetched. It is preferable that, in order to maintain the order of processing the fetched instructions, the instructions stored in instruction registers IR0 to IR3 are arranged in the order in which they were fetched because, in this way, instruction decoder 3 can easily determine which instruction register stores the instruction that must be processed at first. First shift register SR1 changes the instructions stored in each instruction register for each cycle in order to maintain the order of each instruction in instruction registers IR0 to IR3. That is, first shift register SR1 shifts the instructions and the flags received from instruction decoder 3 to the left by the amount corresponding to the CNT signal from instruction decoder 3. As a result, the position of the instruction fetched earliest and the flag corresponding thereto is shifted to the left end. After this shifting operation, if the output of first shift register SR1 is transferred to each instruction register and flag register, the instruction which was fetched earliest and the flag corresponding thereto are stored in instruction register IR0 and the flag register FR0. Furthermore, still older instructions and flags corresponding thereto are stored in the order of (instruction register IR1, flag register FR1), (instruction register IR2, flag register FR2), (instruction register IR3, flag register FR3). Accordingly, instruction decoder 3 determines possibility of parallel execution of an instruction stored in each instruction register, using instruction register IR0 on the left end as a starting point all the time. The operation of first shift register SR1 will be described later in detail.

FIG. 2 is a diagram showing one example of the operation according to the embodiment shown in FIG. 1. Specific examples of the operation in accordance with the embodiment shown in FIG. 1 will be described below with respect to each cycle, referring to FIG. 2.

(1) Cycle 1

In cycle 1, since an instruction is read out from instruction cache 1, the ICR signal is at logic 1. At this time, instruction 1 stored in instruction register IR0 is only supplied to any of processing units 4 to 7 by instruction decoder 3. That is, it is determined that other instructions 2 to 4 cannot be processed in parallel with instruction 1 and only instruction 1 is a target object of the process. Accordingly, the value of the CNT signal supplied from instruction decoder 3 is 1. As the ICR signal is at logic 1, selector 300 selects the CNT signal and provides a NUM signal. Accordingly, the value of the NUM signal becomes 1. The NUM signal is stored in empty number register 11.

(2) Cycle 2

The number (1) of empty instruction registers in the previous cycle (cycle 1) is stored in empty number register 11. In cycle 2, as shown in FIG. 2, instructions 2, 3, 4 which were not supplied to the processing units in the previous cycle are supplied to instruction registers IR0, IR1, IR2 by first shift register SR1, respectively. At this time, instructions 5, 6, 7, 8 read out from instruction cache 1 are stored in second shift register SR2. Second shift register SR2 eliminates instructions 6, 7, 8 leaving instruction 5 only by carrying out the shifting operation the number of times (in this case, three times) determined by the NUM signal. This instruction 5 is transferred to instruction register IR3 through selector 103. As stated above, in cycle 2, as the instruction is read out from instruction cache 1, the ICR signal is at logic 1. Instruction decoder 3 determines that instructions 2, 3 stored in instruction registers IR0, IR1 can be processed in parallel and provides these instructions 2, 3 to any of processing units 4 to 7. Therefore, the value of the CNT signal is 2. As the ICR signal is at logic 1, selector 300 selects the CNT signal and provides a NUM signal. Accordingly, the value of the NUM signal becomes 2. The NUM signal is stored in empty number register 11.

(3) Cycle 3

The number (2) of empty instruction registers in the previous cycle (cycle 2) is stored in empty number register 11. In cycle 3, as shown in FIG. 2, instructions 4, 5 which were not provided to the processing units in the previous cycle are supplied to instruction registers IR0, IR1 by first shift register IR1, respectively. Instructions 6, 7 are only left by the shifting operation among the four instructions 6, 7, 8, 9 read out from instruction cache 1 and stored in second shift register SR2, and are transferred to instruction registers IR2, IR3 through selectors 102, 103. In this way, since the instruction is read out from instruction cache 1 in cycle 3, the ICR signal is at logic 1. Instruction decoder 3 determines that instructions 4, 5 stored in instruction registers IR0, IR1 can be processed in parallel and transfer these instructions 4, 5 to any of the processing units 4 to 7. Accordingly, the value of the CNT signal is 2. As the ICR signal is at logic 1, selector 300 selects the CNT signal and provides a NUM signal. Therefore, the value of NUM signal becomes 2. The NUM signal is stored in empty number register 11.

(4) Cycle 4

The number (2) of empty instruction registers in the previous cycle (cycle 3) is stored in empty number register 11. In cycle 4, as shown in FIG. 2, instructions 6, 7, which were not supplied to the processing units in the previous cycle, are supplied to instruction registers IR0, IR1 by first shift register SR1, respectively. In cycle 4, since an instruction has not been read out from instruction cache 1 due to some reason (for example, there is no instruction to be read out in instruction cache 1 and it is necessary to transfer an instruction from an external memory), the ICR signal is at logic 0. In addition, no instruction is transferred to the instruction register from second shift register SR2. Therefore, instruction registers IR2, IR3 are empty, that is, undefined data is stored therein. Instruction decoder 3 supplies instruction 6 stored in instruction register IR0 to any of processing units 4 to 7 by itself. That is, instruction decoder 3 determines that instruction 7 stored in instruction register IR1 cannot be processed in parallel with instruction 6 and only supplies instruction 6 to the processing unit. At this time, the value of the CNT signal is 1. As the ICR signal is at logic 0, selector 300 selects the output of adder 10 and supplies a NUM signal. At this time, as adder 10 adds the value (1) of the CNT signal to the value (2) of the output REG of empty number register 11, the value of the NUM signal becomes 3. The NUM signal is stored in empty number register 11.

(5) Cycle 5

The number (3) of empty instruction registers in the previous cycle (cycle 4) is stored in empty number register 11. In cycle 5, as shown in FIG. 2, instruction 7, which was not supplied to the processing unit in the previous cycle, is shifted to instruction register IR0 by first shift register SR1. In cycle 5, no instruction has been read out from instruction cache 1 and the ICR signal is at logic 0. In addition, no instruction has been transferred to the instruction register from second shift register SR2. Therefore, instruction registers IR1 to IR3 are empty. Instruction decoder 3 determines that the operation is stopped in any of the processing unit according to a BUSY signal from the processing unit and stops the operation of decoding an instruction. Accordingly, no instruction is transferred to the processing unit from the instruction register.

The value of the CNT signal is thereby 0. As the ICR signal is at logic 0, selector 300 selects the output of adder 10 and supplies a NUM signal. At this time, as adder 10 adds the value (0) of the CNT signal to the value (3) of the output REG of empty number register 11, the value of the NUM signal is 3. The NUM signal is stored in empty number register 11.

(6) Cycle 6

The number (3) of empty instruction registers in the previous cycle (cycle 6) is stored in empty number register 11. In cycle 6, instructions 8, 9, 10, 11 are read out from instruction cache 1 and stored in second shift register SR2. Instructions 8, 9, 10 among these instructions, 8, 9, 10, 11 are left by the shifting operation and transferred to instruction registers IR1, IR2, IR3 through selectors 101, 102, 103. In this way, in cycle 6, since the instructions are read out from instruction cache 1, the ICR signal is at logic 1. Instruction decoder 3 determines that instructions 7, 8, 9 among the instructions stored in instruction registers IR0 to IR3 can be processed in parallel and supplies these instructions, 7, 8, 9 to any of processing units 4 to 7. The value of the CNT signal thereby becomes 3. As the ICR signal is at logic 1, selector 300 selects the CNT signal and supplies a NUM signal. Accordingly, the value of the NUM signal becomes 3. The NUM signal is stored in empty number register 11.

Figures 4, 5:
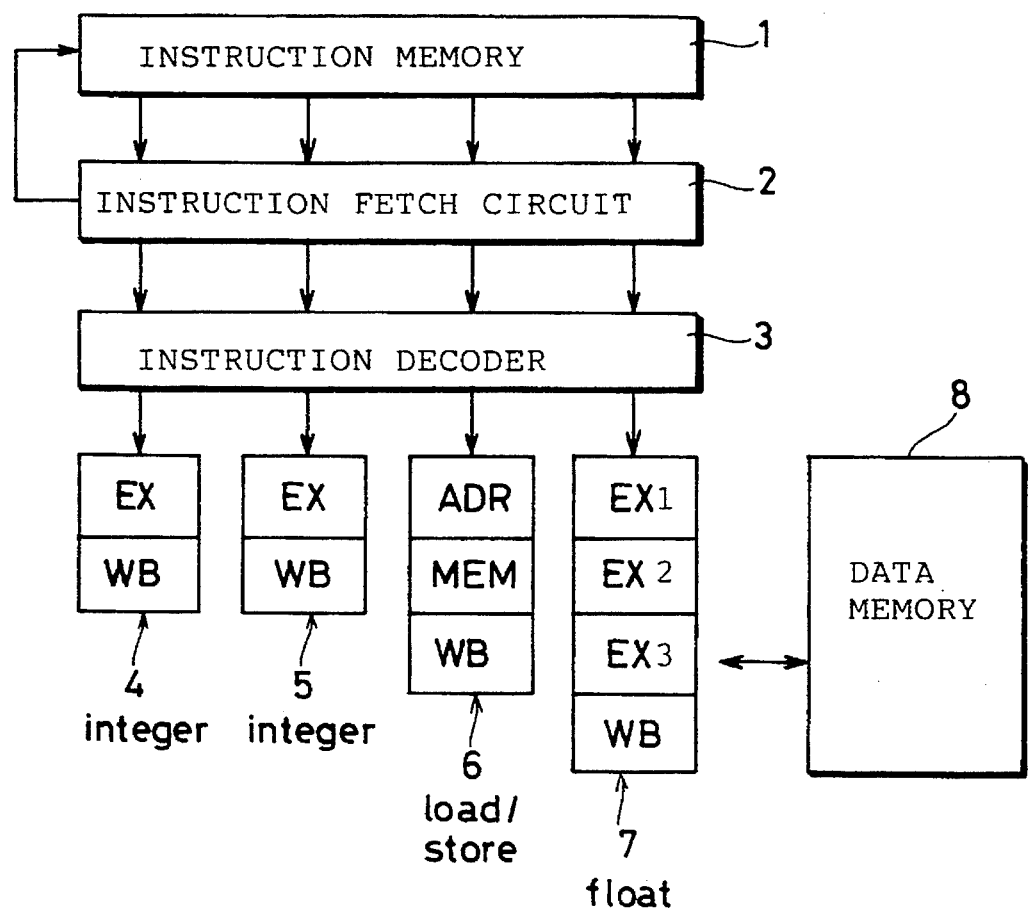
FIG. 4 is a block diagram showing a general structure of a conventional superscalar processor.
FIG. 5 is a diagram showing the operation of the superscalar processor shown in FIG. 4.

As stated above, in the embodiment shown in FIG. 1, a new instruction can be read out from instruction cache 1 and fetched in an empty one among the instruction registers without waiting until all the instructions fetched by instruction registers IR0 to IR3 are supplied to the processing units. Accordingly, target objects for which possibility of parallel processing is determined are not divided for a predetermined number of instructions as shown in FIG. 5, and each processing unit can be utilized efficiently.

A detailed description will now be made of the operation of each portion according to the embodiment shown in FIG. 1.

Firstly, the operation of first shift register SR1 will be described. First shift register SR1 shifts instructions and flags supplied from instruction decoder 3 to the left. The instructions and the flags are shifted with corresponding ones being a pair. The shifting amount of first shift register SR1 is determined by the CNT signal from instruction decoder 3. That is, first shift register SR1 carries out the shifting operation the same number of times as that of instructions which instruction decoder 3 supplied to the processing units from the instruction registers. That is, the shifting amount of first shift register SR1 is controlled as follows:

CNT=0 (the number of output instructions 0): does not shift

CNT=1 (the number of output instructions 1): shifts to the left by 1

CNT=2 (the number of output instructions 2): shifts to the left by 2

CNT=3 (the number of output instructions 3): shifts to the left by 3

CNT=4 (the number of output instructions 4): does not shift.

For example, instructions 1, 2, 3, 4 are stored in instruction registers IR0, IR1, IR2, IR3 and if instruction 1 is only supplied to the processing unit, it leads to CNT=1. First shift register SR1 thereby carries out the shifting operation to the left one time. Accordingly, the order of instructions after the shifting operation becomes 2, 3, 4, x, wherein X represents an empty state. Similarly, each flag is also shifted along with a corresponding instruction. After the shifting operation, first shift register SR1 supplies each instruction and flag in parallel. The instructions supplied in parallel are selected by selector 100 to 103 and written into instruction registers IR0 to IR3. Similarly, the flags supplied in parallel are selected by selectors 200 to 203 and written into flag registers FR0 to FR3.

The operation of second shift register SR2 will now be described. Second shift register SR2 shifts four instructions read out from instruction cache 1 to the right. The shifting amount of second shift register SR2 is determined by the NUM signal from selector 300. That is, the shifting amount of the second shift register SR2 is controlled as follows:

NUM=1 (the number of empty instruction registers is 0): does not shift

NUM=1 (the number of empty instruction registers is 1): shifts to the right by 3

NUM=2 (the number of empty instruction registers is 2): shifts to the right by 2

NUM=3 (the number of empty instruction registers is 3): shifts to the right by 1

NUM=4 (the number of empty instruction registers is 4): does not shift

For example, if instructions 1, 2, 3, 4 are stored in instruction registers IR0, IR1, IR2, IR3 in the previous cycle and instruction 1 is only supplied to the processing unit, it leads to NUM=1, so that second shift register SR2 shifts instructions 5, 6, 7, 8 read out from instruction cache 1 to the right by 3. Accordingly, the instruction after shifting in second shift register SR2 becomes X, X, X, 5. Instruction 5 is written into instruction register IR3 through selector 103. Meanwhile, instructions 2, 3, 4 have been written into instruction registers IR0, IR1, IR2 by first shift register SR1.

The operation of selector control circuit 12 will now be described. Suppose that instructions 1, 2, 3, 4 are stored in instruction registers IR0, IR1, IR2, IR3 in the previous cycle and, for example, instruction 1 among them is only supplied to a processing unit. This case leads to CNT=1. If an instruction is read out from instruction cache 1 in the present cycle, the ICR signal attains logic 1 and the CNT signal is selected as a NUM signal by selector 300. As a result, the value of the NUM signal becomes 1. As instructions 1, 2, 3, 4 which first shift register SR1 received from instruction decoder 3 are shifted to the left by 1, the instruction outputs of first shift register SR1 after the shifting operation are 2, 3, 4, X. Since four instructions 5, 6, 7, 8 read out from instruction cache 1 are shifted to the right by 3 in second shift register SR2, the instruction outputs of second shift register SR2 are X, X, X, 5. Selectors 100 to 103 are controlled by selector control circuit 12 which responds to the NUM, signal and make selections as follows:

Selector 100: a
Selector 101: a
Selector 102: a
Selector 103: b.

As a result, instructions 2, 3, 4, 5 are stored in instruction registers IR0, IR1, IR2, IR3, respectively.

As for the flags stored in flag registers FR0 to FR3, the flags after being shifted by first shift register SR1 are supplied to each terminal a of selectors 200 to 203. The ICR signal from instruction cache 1 is supplied to each terminal b of selectors 200 to 203. In the case of this example, selectors 200 to 203 are controlled by selector control circuit 12 which responds to the NUM signal, and make selections as follows.

Selector 200: a
Selector 201: a
Selector 202: a
Selector 203: b

As a result, the flag of instruction 2, the flag of instruction 3, the flag of instruction 4, and the logical value of the ICR signal are stored in flag registers FR0, FR1, FR2, FR3, respectively.

General relationships between the NUM signal and the selection states of selectors 100 to 103, 200 to 203 are shown in FIG. 3.

A description will now be made of effects of flags to be stored in flag registers FR0 to FR3. Each flag indicates validity/invalidity of an instruction stored in a corresponding instruction register. For example, an instruction corresponding to a flag to which logic 1 is set is valid and an instruction corresponding to a flag to which logic 0 is set is invalid. Each flag is referred to when instruction decoder 3 decodes an instruction. That is, instruction decoder 3 only treats instructions corresponding to flags to which logic 1 is set as being valid instructions and decodes these instructions only. This prevents an undefined data from being supplied to the processing unit. The flags stored in flag registers FR0 to FR3 along with corresponding instructions are transferred to first shift register SR1 through instruction decoder 3. First shift register SR1 pairs an instruction with a corresponding flag and carries out the shifting operation. The shifting operation in first shift register SR1 is carried out as stated above. Accordingly, instructions are shifted by first shift register SR1, keeping validity/invalidity of the instructions stored in each instruction register. If an instruction newly read out from instruction cache 1 is fetched in an instruction register, the ICR signal is written into a flag register corresponding to the instruction register. As the ICR signal is at logic 1 in the cycle in which an instruction is read out from instruction cache 1, an instruction which is newly fetched into the instruction register at this time is hereinafter treated as valid data. Meanwhile, the ICR signal of logic 0 is written into a flag register corresponding to an emptied instruction register in the cycle in which an instruction is supplied to the processing unit from the instruction register but an instruction cannot be fetched from instruction cache 1. Accordingly, data stored in emptied instruction registers is hereinafter treated as being invalid.

As stated above, in the embodiment shown in FIG. 1, a new instruction can be read out from the instruction cache and supplied to an emptied instruction register as a supplement without waiting until all the instructions stored in instruction registers IR0 to IR3 are supplied to the processing units. Furthermore, in the embodiment shown in FIG. 1, an instruction can be read out from instruction cache 1 and a new instruction can be fetched into an empty instruction register even if instruction decoder 3 cannot supply instructions due to Busy signal from the processing unit due to the BUSY signal from the processing unit. Accordingly, in accordance with the embodiment shown in FIG. 1, it is possible to control the occurrence of empty ones among instruction registers IR0 to IR3 to a minimum. As a result, the number of instructions supplied from instruction decoder 3 in a parallel manner is increased, making it possible to utilize each processing unit efficiently and sharply increase the processing speed.

As stated above, according to the present invention, it is possible to efficiently utilize processing units provided in a parallel manner and remarkably increase the processing speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A superscalar processor operating cyclically, comprising:
   a plurality of processing units provided in a parallel manner and capable of executing simultaneously provided instructions in a parallel manner;
   instruction storage means storing a plurality of instructions to be processed;
   fetch means, including a plurality of instruction registers, for reading a predetermined plurality of instructions from said instruction storage means and providing a multiple of the read predetermined plurality of instructions to the plurality of instruction registers;
   a decode means for decoding an instruction stored in each instruction register for each cycle and supplying the same to said plurality of processing units, said decoder means also selecting instructions which can be executed in a parallel manner and supplying the same to said plurality of processing units at the same time; and
   empty number detection means for detecting the number of empty instruction registers for each cycle,
   said fetch means further including control means for controlling providing the multiple of the read predetermined plurality of instructions to said plurality of instruction registers for each cycle in response to the detected number of empty instruction registers.

2. The superscalar processor according to claim 1, wherein
   in a cycle in which required instructions by the superscalar processor are supplied from said instruction storage means to the superscalar processor, said empty number detection means detects the number of instructions supplied to said plurality of processing units by said decode means as the number of empty instruction registers, and
   in a cycle in which required instructions by the superscalar processor are not supplied from said instruction storage means to the superscalar processor, said empty number detection means detects the number of empty instruction registers detected plus the number of instructions presently supplied to said plurality of processing units by said decode means as the number of empty instruction registers.

3. The superscalar processor according to claim 2, wherein said empty number detection means includes:
   empty number storage means for storing the number of empty instruction registers detected in said preceding cycle;
   adding means for adding the number of instructions supplied to said plurality processing units by said decode means to the number of empty instruction registers stored in said empty number storage means; and
   empty number selecting means for selecting
      i. the number of instructions supplied to said plurality of processing units by said decode means in response to an indication that the cycle is a cycle in which at least one instruction is readout from said instruction storage means, and
      ii. the result of said adding means in response to an indication that the cycle is a cycle in which no instruction is readout from said instruction storage means, and
   supplying the same to said control means as the number of empty registers.

4. The superscalar processor according to claim 3, wherein for each cycle said instruction storage means supplies an identification signal indicating whether or not an instruction has been fetched therefrom and said empty number selecting means carries out said selecting in response to said identification signal.

5. The superscalar processor according to claim 1, wherein said control means includes storage position moving means for moving a storage position of each instruction within said plurality of instruction registers after the termination of the decoding operation by said decode means.

6. The superscalar processor according to claim 5, wherein said storage position moving means includes first shift means for shifting the instructions of said plurality of instruction registers which are not supplied to said plurality of processing units by said decode means to the storage position of instructions which are supplied to said plurality of processing units by said decode means, which is a first direction, and transferring the instructions having their storage position shifted to said plurality of instruction registers.

7. The superscalar processor according to claim 6, wherein a number of storage positions shifted in said first direction by said storage position moving means in a current cycle is equal to the number of instructions supplied to said plurality of processing units by said decode means in the previous cycle.

8. The superscalar processor according to claim 6, wherein said control means includes second shift means for temporarily storing said predetermined plurality of instructions read out form said instruction storage means and shifting the storage position of each instruction for each cycle, in a second direction, opposite said first direction, when at least one instruction was supplied to said plurality of processing units in the previous cycle.

9. The superscalar processor according to claim 8, wherein
   the number of storage positions shifted in said second direction is a function of the number of empty instruction registers detected by said empty number detection means, and
   the instructions remaining in said second shift means after said shifting operation are transferred to the plurality of instruction registers.

10. The superscalar processor according to claim 8, wherein said control means further includes:
    a plurality of instruction selection means provided corresponding to each instruction register for selecting one of a corresponding output of said first shift means and a corresponding output of said second shift means, and supplying the same to a corresponding instruction register; and selecting control means for controlling a selection state of each instruction selection means in response to the number of empty instruction registers.

11. The superscalar processor according to claim 1, wherein said decode means stops the operation of decoding an instruction when any of said plurality of processing means is not executing provided instructions.

12. The superscalar processor according to claim 11, wherein said fetch means, including said control means, and said empty number detection means continue respective operations in a cycle in which said decode means cannot supply instructions to said plurality of processing units.

* * * * *